United States Patent [19]

Armstrong

[11] 4,015,467

[45] Apr. 5, 1977

[54] SUB-CYCLIC MEASUREMENTS OF SPEED AND TIME FOR INTERNAL COMBUSTION ENGINE HORSEPOWER INDICATION

[75] Inventor: Lee R. Armstrong, Enfield, Conn.

[73] Assignee: United Technologies Corporation, Hartford, Conn.

[22] Filed: May 7, 1976

[21] Appl. No.: 684,217

[52] U.S. Cl. .................................................. 73/116
[51] Int. Cl.² ............................................ G01L 5/26
[58] Field of Search .................... 73/116, 117, 118; 235/92 CA, 92 FQ, 92 GE, 92 MP, 92 TC, 92 TF, 150.2, 151.3

[56] References Cited

UNITED STATES PATENTS 3,964,301  6/1976  Hanson ................................ 73/116

OTHER PUBLICATIONS

B569,859, Mar. 1976, Hanson, 73/116.

*Primary Examiner*—James J. Gill
*Attorney, Agent, or Firm*—M. P. Williams

[57] ABSTRACT

Indications of speed of an internal combustion engine are derived from an engine member rotating directly with the crankshaft, such as the teeth on the flywheel, so as to provide indications for speed measurements on a sub-cycle basis (that is, many times during each revolution), a timer is started after a threshold speed is reached as determined by comparison with the sub-cyclic speed indications, and a measurement of speed is made contemporaneously with starting the counter; after an elapsed time interval which may be on the order of several cycles, which is determined by the acceleration of the engine, the timer is stopped and the speed is once again measured. In one embodiment, the speed is continuously compared against an upper reference speed during the interval that the timer is running, and when the upper reference speed is reached, the timer is stopped. In a second embodiment, the interval of the timer is fixed, and instantaneous speed is measured at time-out. In either instance, the starting speed, the stopping speed, and the elapsed time are all accurately related and may be utilized in accordance with known techniques for computing factors relating to torque and horsepower.

4 Claims, 3 Drawing Figures

FIG.1

SUB-CYCLIC MEASUREMENTS OF SPEED AND TIME FOR INTERNAL COMBUSTION ENGINE HORSEPOWER INDICATION

CROSS REFERENCE TO RELATED APPLICATIONS

Some of the subject matter disclosed herein is disclosed and claimed in a commonly owned copending application filed on even date herewith by Willenbecher et al, Ser. No. 684,219, entitled SUB-CYCLIC SPEED AND CYCLIC TIME MEASUREMENTS FOR INTERNAL COMBUSTION ENGINE HORSEPOWER INDICATION.

BACKGROUND OF THE INVENTION

1. Field of the Invention

This invention relates to diagnosing internal combustion engines electronically.

2. Description of the Prior Art

In the measurement of factors relating to the general health of the engine, it has been known to provide indications related to torque, which then may be related through speed to horsepower, to provide a general indication of engine health. It is well known that horsepower is the product of speed and torque; torque, on the other hand is a function of acceleration and inertia; thus horsepower can be taken as some constant times speed and acceleration. If the acceleration and the speed are taken at the same speed, then error exists only in the fact that the resulting measured horsepower includes factors related to frictional drag and loading of the engine (such as by engine accessories). However, it is known that these factors can be accommodated by emperical formulas of various kinds.

In one technique known to the art, the engine is allowed to undergo a burst acceleration from a low speed to a high speed, the speed of the engine is monitored, and the elapsed time between sensing of first and second speeds is measured. The problem in this technique is that the speed measurement is made over an entire engine cycle, so the precise time at which the engine crosses the lower threshold speed and the upper threshold speed, thereby to accurately measure the time interval required for the engine to accelerate from one speed to another, cannot be known. In this technique, interpolation based on the difference between the average speeds sensed over succeeding cycles and the desired threshold speeds is utilized to correct the time increment otherwise measured between cycles which follow the sensing of threshold speeds. It is alleged that such a technique eliminates errors resulting from sub-cyclic speed variations which are known to occur in internal combustion engines as a result of the individual cylinder contributions to acceleration when combustion occurs and the individual contributions to cylinders to deceleration during compression for that cylinder; however, the errors resulting from gross interpolation to estimate speeds within each cycle of the engine may well exceed the cyclic variations overcome thereby.

SUMMARY OF THE INVENTION

Objects of the present invention include provision of sub-cyclic speed measurements in internal combustion engines and accurate correlation of speed and time in measurements made relating to engine acceleration for use in horsepower indications.

According to the present invention, measurement of acceleration of an internal combustion engine while utilizing its own inertia, drag and accessory loading as an engine load, is accurately made by utilizing substantially instantaneous, sub-cyclic speed measurements at the precise times of starting and stopping an interval timer which accurately measures elapsed time over a significant fraction of the acceleration of the engine which is at least greater than one engine cycle. According further to the invention, speed of the engine is monitored as the engine accelerates, and once a beginning threshold speed is reached, an interval timer is engaged commensurately with an accurate recordation of speed, and following an interval which is either speed-dependent or fixed, the interval timer is disengaged commensurately with an accurate recordation of speed; the actual, substantially instantaneously measured speed, determined on a sub-cycle basis, thereby correlates exactly with the extent of the timed interval.

In accordance with one aspect of the invention, measurement of predetermined beginning and ending speed, regardless of the portion of an engine cycle in which they actually occur, is used to start and stop an interval timer. In accordance with another aspect of the invention, the time interval is fixed; achieving a first speed starts the interval, and time-out causes measurement of the second speed.

The present invention, by utilizing substantially instantaneous speed readings allows accurate measurement of speeds to define a time interval which spans a significant portion of the acceleration pattern of an engine, thereby providing a simple method of indicating average acceleration for use in torque and horsepower calculations. Starting and stopping of the time interval in response to sensing on an instantaneous basis the achievement of predetermined speeds provides for a constant change in speed, thereby avoiding the necessity for calculations to determine the change in speed over the time interval.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENTS

Figure 1:
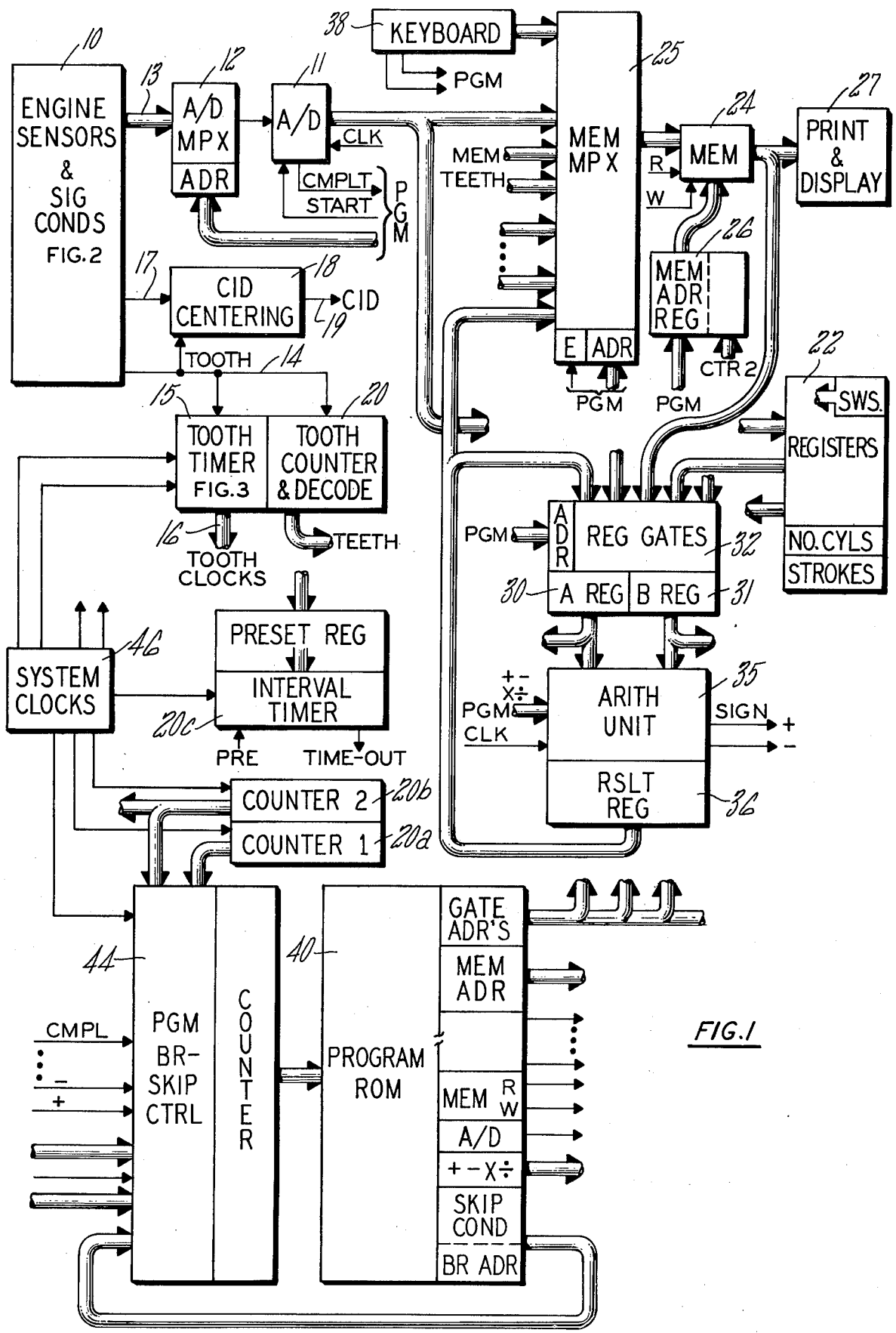
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. The outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17, and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of test being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped once or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as the keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
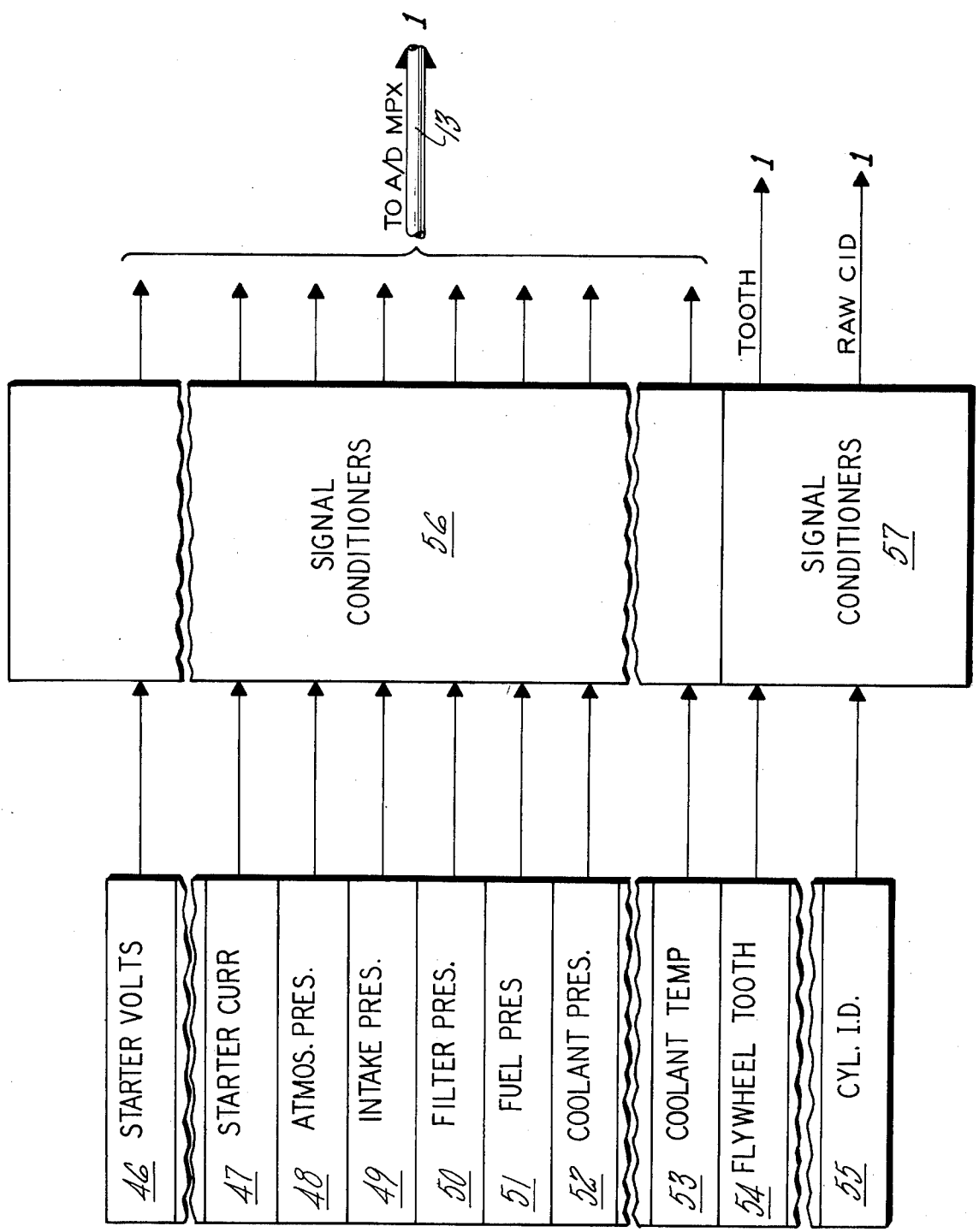
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others now shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Florida, for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
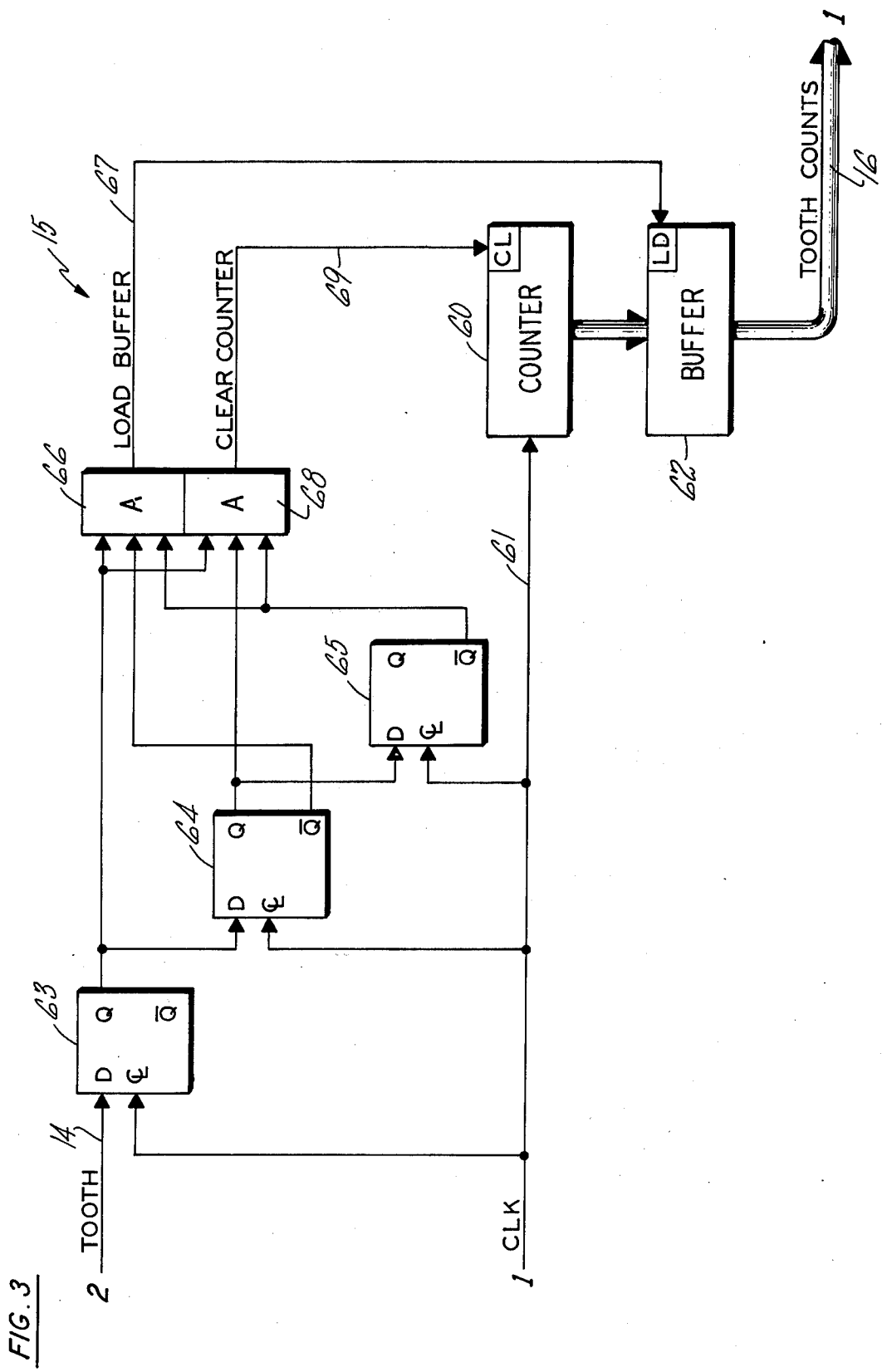
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 10 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flop 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counted in the counter 60. Whenever the tooth signal disappears, (which is totally immaterial) the next three clock signals in a row will cause resetting of the flip flops 63-65, in turn, since each of their D inputs will go down. The counter and the buffer are independent of the resetting of the flip flops 63-65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth in a commonly owned copending application of Stick et al, Ser. No. 684,037, entitled "Determination of Number of Teeth on an Internal Combustion Engine Flywheel". Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)", indicate addresses, chosen at will by the programmer, or partially determined by counter two, if so indicated.

The exemplary system herein is designed for four-stroke, six-cylinder engines. If desired, the programming may be altered to compare counts (particularly counter two) with loaded indications of engine variables, such as cylinders, in a well known fashion.

The present invention accurately measures speed at two points in time, as an engine is accelerating with its own inertia, drag, and engine accessory load for loading, at a first point and a second point which are spread substantially across the acceleration pattern of the engine from low idle to high idle. The invention utilizes instantaneous speed, measured on a sub-cyclic basis, to provide a very accurate correlation between speeds measured at the low and the high ends of the acceleration pattern and the time interval between the speed measurements. The invention may be practiced in either of two ways, depending on any particular implementation thereof. A first manner of practicing the present invention is to sense a predetermined starting speed at the low end of the acceleration pattern of the engine, and starting an interval timer having a fixed time out interval. When the interval timer times out, a second speed measurement is immediately made. The second speed measurement is the only unknown, since the time between them and the first speed measurement are predetermined. The second method of practicing the present invention is to sense a first speed at the low end of the acceleration pattern of the engine, start an interval timer, sense a second predetermined speed at the high end of the acceleration pattern, and stop the interval timer. In this case the time measured by the interval timer is the only unknown since the starting and stopping speeds are predetermined.

The speed measurements herein are made by the tooth timer, which senses the passage of teeth and records a count of the number of clock signals fed to a counter on a tooth-to-tooth basis. The fraction of a revolution traversed as each tooth passes the sensor is simply the ratio of one divided by the total number of teeth. The time for that fraction of a revolution to occur is simply the counts of the interval timer divided by the frequency of clock signals fed to the interval timer. Since frequency of the clock feeding the counter is expressed in Hz, and speed is normally expressed in revolutions per minute, a factor of 60 must be employed in a well known fashion. To actually determine the speed from the counts provided by the tooth counter the relationship is the ratio of one tooth to the total number of teeth, which is divided by the ratio of the counts to the frequency (the frequency in turn having to be first divided by 60 to yield a result in rpm's). Rewritten this results in the frequency of the clock times 60, all of which is divided by the total number of flywheel teeth times the counts in the timer. This may be predetermined as a speed factor, so that any time a speed reading is required, it can be taken simply by dividing the speed factor by the number of counts in the timer, according to the following instructions:

1. Load MEM (Freq) to A REG
2. Load MEM (RGT) to B REG
3. Divide
4. Load RSLT to A REG
5. Load 60 Factor to B REG
6. Multiply
7. Load RSLT to MEM (Spd Factor)

On the other hand, when comparing the actual speed of the engine as determined by the tooth timer with predetermined speeds (such as the starting speed for horsepower measurement) one can reverse the position of speed and counts in the relationships described hereinbefore and determine in advance the number of counts which the tooth timer will have when the engine has a predetermined speed. This is done generally by multiplying the frequency of the clock times 60, all of which is divided by the product of the total number of teeth on the flywheel and the desired starting speed in rpm. This can be accomplished in the exemplary diagnostic system of FIG. 1 with the following instructions.

8. Load MEM (Freq) to A REG
9. Load MEM (RGT) to B REG
10. Divide
11. Load RSLT to A REG
12. Load MEM (Start Spd) to B REG
13. Divide
14. Load RSLT to A REG
15. Load 60 Factor to B REG
16. Multiply
17. Load RSLT to B REG Then the system can simply monitor the tooth timer counts, continuously subtracting the tooth timer counts from the predetermined counts. Since counts become smaller and smaller as the speed increases, when the speed of the engine exceeds the predetermined speed, then the predetermined counts will exceed the tooth timer counts and this can be determined by doing a reverse subtract and looking for a negative result as set forth in the following instructions:

18. Load Tooth timer to A REG
19. Subtract; Skip one if −
20. Branch to 18

In the present example, it is assumed that an interval timer of a constant time interval is being utilized, so that when the timer times out, the second speed reading must be made. This speed reading is made by comparison with the precomputed speed factor (instructions 1–7) as described hereinbefore. An exemplary process may be in accordance with the following instructions:

21. Start Interval timer
22. Skip 1 if time out
23. Branch to 22
24. Load Tooth timer to B REG
25. Load MEM (Spd Factor) to A REG
26. Divide
27. Load RSLT to A REG
28. Load MEM (Start Spd) to B REG
29. Subtract
30. Load RSLT to MEM (wherever desired)

The particular manner in which the tooth speeds and time are utilized forms no part of the present invention. It is known that torque is the product of inertia and acceleration, and that torque at a given speed is related to horsepower. There are many methods in the prior art known for utilizing these factors, most of which employ some sort of emperically determined constant to provide a more accurate relationship between the gross acceleration sensed (the difference in the two speeds over the time interval measured) to a meaningful relationship with respect to horsepower.

The second method in which the present invention may be practiced does not utilize a fixed time interval, but utilizes fixed starting and stopping speeds, and senses the time interval, which may be in accordance with the following instructions:
31. Load MEM (Freq) to A REG
32. Load MEM (RGT) to B REG
33. Divide
34. Load RSLT to A REG
35. Load MEM (End Spd) to B REG
36. Divide
37. Load RSLT to A REG
38. Load 60 Factor to B REG
39. Multiply
40. Load RSLT to B REG
41. Load Tooth timer to A REG
42. Subtract; Skip one if −
43. Branch to 32
44. Stop Interval timer
45. Load Interval timer to MEM (wherever desired)

Thus, the invention senses speed so quickly, on a sub-cyclic basis, that it can provide an accurate relationship between two speeds and an interval between the two speeds, during an acceleration pattern of an engine, so as to provide meaningful information which may be used in any desired fashion, and as had been used in the prior art to formulate some indication of horsepower. Because the invention can measure speed instantaneously, there is no need for any fudge factors to accommodate cyclic speed measurements, which are frequently off by tens of percents.

Although the invention has been shown and described with respect to preferred embodiments thereof, it should be understood by those skilled in the art that the foregoing and various other changes, omissions and additions be made therein and thereto without departing from the spirit and the scope of the invention.

Having thus described typical embodiments of my invention, that which I claim as new and desire to secure by Letters Patent is:

1. Apparatus for providing indications of speed of an internal combustion engine at two points in time, spaced across a significant portion of an acceleration profile of the engine while accelerating, together with an accurate measure of the elapsed time between the two speed measurements, comprising:
 means for registering indications of a starting threshold speed and an ending threshold speed and providing a start speed data manifestation and an end speed data manifestation in response thereto;
 speed sensing means, adapted to be disposed for response to a mechanical movement of a portion of the engine through successive angles which are a small fraction of a full revolution of the engine, for successively providing measured data manifestations of the time elapsed during angular revolution of the engine through said known angle;
 an interval timer operative in response to command input signals applied thereto to commence timing of an interval and to cease timing of an interval and to provide an elapsed time manifestation indicative of the interval of time measured thereby; and
 processing means responsive to said speed sensing means and to said registering means for comparing said measured data manifestation against said start manifestation and said end data manifestation and for providing a start command input signal to said interval timer in response to said measured data manifestations indicating a speed as high as the speed represented by said start data manifestation, and responsive to said measured data manifestation indicating that the engine has achieved a speed equal to said end speed manifestation to provide a stop command input signal to said interval timer.

2. In the method of providing indications of speed of an interval combustion engine at two points in time spaced across a significant portion of an acceleration profile of the engine while accelerating, together with an accurate measure of the elapsed time between the two measurements, the steps of:
 providing indications of a starting threshold speed and an ending threshold speed;
 measuring the instantaneous speed of the engine by monitoring mechanical rotation of a portion of the engine through successive angles which are a small fraction of a full revolution of the engine; and
 repeating the speed measuring step and comparing the speed to said starting threshold speed until the speed exceeds the starting threshold and in response thereto starting an interval timer operative to provide an elapsed time manifestation indicative of the interval of time measured thereby, repeating the speed measuring step and comparing the speed to said ending threshold speed until the speed exceeds the ending threshold and in response thereto stopping the interval timer.

3. Apparatus for providing indications of speed of an internal combustion engine at two points in time, spaced across a significant portion of an acceleration profile of the engine while accelerating, together with an accurate measure of the elapsed time between the two speed measurements, comprising:
 means for registering indications of a starting threshold speed and providing a start speed data manifestation in response thereto;
 speed sensing means, adapted to be disposed for response to a mechanical movement of a portion of the engine through successive angles which are a small fraction of a full revolution of the engine, for successively providing measured data manifestations of the time elapsed during angular revolution of the engine through said known angle;
 an interval timer operative in response to command input signals applied thereto to commence timing of a fixed interval and to provide a time-out signal after the interval of time measured thereby; and
 processing means responsive to said speed sensing means and to said registering means for comparing said measured data manifestation against said start manifestation and, in response to said measured data manifestation indicating a speed as high as the speed represented by said start data manifestation, for providing a start input command signal to said interval timer and responsive to said time-out signal to register a measured data manifestation indicating the engine speed at the time-out of said interval timer.

4. In the method of providing indications of speed of an interval combustion engine at two points in time spaced across a significant portion of an acceleration profile of the engine while accelerating, together with an accurate measure of the elapsed time between the two speed measurements, the steps of:
 providing an indication of a starting threshold speed;
 measuring the instantaneous speed of the engine by monitoring mechanical rotation of a portion of the engine through successive angles which are a small fraction of a full revolution of the engine;

repeating the speed measuring step and comparing the speed to said starting threshold speed until the speed exceeds the threshold speed and in response thereto starting an interval timer operative to time a fixed interval and to provide a time-out signal after said fixed interval of time has elapsed; and
sensing the time-out signal from said interval timer and in response thereto repeating said speed measuring step and recording speed measured thereby.

* * * * *